(12) United States Patent
Hosotani

(10) Patent No.: US 6,208,530 B1
(45) Date of Patent: *Mar. 27, 2001

(54) SWITCHING POWER SUPPLY DEVICE HAVING MAIN SWITCHING ELEMENT PERIOD CONTROL CIRCUIT

(75) Inventor: Tatsuya Hosotani, Mukou (JP)

(73) Assignee: Murata Manufacturing Co., Ltd. (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/299,256

(22) Filed: Apr. 26, 1999

(30) Foreign Application Priority Data

Apr. 28, 1998 (JP) .................................................. 10-118927

(51) Int. Cl.[7] .................................................. H02M 3/335
(52) U.S. Cl. .................................................. 363/19
(58) Field of Search ................................. 363/19, 18, 97

(56) References Cited

U.S. PATENT DOCUMENTS 4,573,112 * 2/1986 Numata et al. ......................... 363/21
4,942,508 * 7/1990 Nakamura .............................. 363/19

* cited by examiner

Primary Examiner—Shawn Riley
(74) Attorney, Agent, or Firm—Ostrolenk, Faber, Gerb & Soffen, LLP

(57) ABSTRACT

A switching power supply device in which the increase in the switching frequency when the load is light is restrained, whereby the switching loss is reduced, intermittent oscillating operation is prevented, and heat generation in the main switching device at the time of short-circuiting is restrained. In a switching power supply device, the charging/discharging time of a capacitor of a switch circuit comprising a time-constant circuit is controlled so as to make the OFF-period of a main switching element a predetermined period that continues after the completion of the discharge of excitation energy from the secondary coil of a transformer of the power supply device.

7 Claims, 5 Drawing Sheets

SWITCHING POWER SUPPLY DEVICE HAVING MAIN SWITCHING ELEMENT PERIOD CONTROL CIRCUIT

BACKGROUND OF THE INVENTION

1. Field of the Invention

The present invention relates to a switching power supply device and, in particular, to a switching power supply device of a self-oscillation type ringing choke converter (hereinafter referred to as RCC) system.

2. Description of the Related Art

Generally speaking, electronic apparatus such as computers and communication apparatus require a stable DC voltage. To supply a stable DC voltage to such apparatus from a commercial AC power supply, a switching power supply device comprising an RCC circuit having a relatively simple structure and high efficiency is widely used. The construction of such a switching power supply device will be described with reference to FIG. 4.

In FIG. 4, numeral 1 indicates a switching power supply device, which comprises an input circuit 2, a DC-DC converter circuit 3, a voltage detection circuit 4 and a control circuit 5.

The input circuit 2 comprises a rectifying diode bridge DB, a fuse F provided between an AC power source and the input terminal of the diode bridge DB, and a filter circuit LF.

The DC-DC converter circuit 3 comprises a smoothing capacitor C1 provided between the output terminals of the diode bridge DB of the input circuit 2, a transformer T having a primary coil N1, a secondary coil N2 of a polarity opposite to that of the primary 466 coil N1 and a feedback coil Nb of the same polarity as the primary coil N1, an FET Q1 as a main switching element connected in series to one end of the primary coil N1 of the transformer T, a starting resistor R1 connected between the other end of the primary coil N1 and the gate serving as the control terminal of the FET Q1, a resistor R10 connected between the gate and source of the FET Q1, a rectifying diode D1 connected in series to one end of the secondary coil N2 of the transformer T and a smoothing capacitor C4 connected between the ends of the secondary coil N2.

The voltage detection circuit 4, which is provided on the output side of the DC-DC converter circuit 3, comprises a resistor R5, a light-emitting diode PD on the light emission side of a photocoupler PC, a shunt regulator Sr and resistors R6 and R7. The resistor R5, the light-emitting diode PD and the shunt regulator Sr are connected in series to each other and arranged in parallel with the capacitor C4 of the DC-DC converter circuit 3. The resistors R6 and R7 are also connected in series to each other and arranged in parallel with the capacitor C4. The point of connection of the resistor R6 and R7 are connected to the shunt regulators Sr.

The control circuit 5 comprises a resistor R13 and a capacitor C3 connected in series between one end of the feedback coil Nb and the gate of the FET Q1, a transistor Q2 connected between the gate and source of the FET Q1, a resistor R2 connected between one end of the feedback coil Nb and the base of the transistor Q2, a resistor R3 and a capacitor C2 connected in parallel between the base and emitter of the transistor Q2, a resistor R4 connected in series between one end of the feedback coil Nb and the base of the transistor Q2, a diode D2 and a phototransistor PT on the light reception side of the photocoupler PC.

Next, the operation of the switching power supply device 1, constructed as described above, will be explained.

When starting the device, voltage is applied to the gate of the FET Q1 through the resistor R1 to turn on the FET Q1. When the FET Q1 is turned on, power source voltage is applied to the primary coil N1 of the transformer T and a voltage is generated in the feedback coil Nb in the same direction as that of the voltage generated in the primary coil N1, the FET Q1 being rapidly turned on by positive feedback. At this time, excitation energy is accumulated in the primary coil N1.

When the base electric potential of the transistor Q2 has reached a threshold value, the transistor Q2 is turned on and the FET Q1 is turned off. As a result, the excitation energy accumulated in the primary coil N1 of the transformer T during the ON-period of the FET Q1 is discharged as electrical energy through the secondary coil N2, rectified by the diode D1, and smoothed by the capacitor C4 before it is supplied to the load.

When the excitation energy accumulated in the primary coil N1 of the transformer T has been entirely discharged, a voltage is generated in the feedback coil Nb and the FET Q1 is turned on. When the FET Q1 is turned on, a voltage is again applied to the primary coil N1 of the transformer T, and excitation energy is accumulated in the primary coil N1.

This oscillating operation is repeated in the switching power supply device 1.

In the normal state, the output voltage on the load side is divided by the resistors R6 and R7, and the detection voltage obtained through this division is compared with a reference voltage of the shunt regulator Sr. Then, the variation in the output voltage is amplified by the shunt regulator Sr and the current flowing through the light-emitting diode PD of the photocoupler PC varies. The impedance of the phototransistor PT varies according to the light emission amount of the light-emitting diode PD, whereby it is possible to vary the charge/discharge time of the capacitor C2, thereby effecting control such that the output voltage is constant.

In the conventional switching power supply device 1, however, the switching frequency of the FET Q1 varies substantially inversely with the load power due to the characteristics of the RCC. In particular, the switching frequency increases when the load is light. As a result, the switching loss increases, and the circuit efficiency deteriorates. That is, as shown in FIG. 5, the lengths of the ON period and the OFF period determining the switching frequency of the FET Q1 are in proportion to the load. FIG. 5 shows the case in which the load is relatively heavy (a), the case in which the load is a medium one (b) and the case in which the load is light (c). Numerals t1, t11 and t21 indicate OFF-periods of the FET Q1, and numerals t2, t12 and t22 indicate ON-periods of the FET Q1. Under the condition in which the input/output voltage is constant, the ratio of the ON-period to the OFF-period is always constant regardless of whether the load is heavy or light. The value of t1:t2 in (a), the value of t11::t12 in (b) and the value of t21:t22 in (c) are equal to each other. Thus, the switching frequency fluctuates to a large degree as a result of variation in the load. When the load is light, the switching frequency increases and the switching loss increases, with the result that the circuit efficiency deteriorates.

Further, when the switching frequency increases, the control circuit 5 cannot respond thereto, and a so-called intermittent operation is generated. Due to this intermittent operation, the output ripple noise voltage, for example, increases. Further, when the switching frequency increases, the EMI noise of the switching power supply device 1 is more difficult to cope with than in the case in which the switching frequency is low.

Further, at the time of short-circuiting, the FET Q1 performs an oscillating operation, in which starting and stopping are repeated, so that, when, the starting time is short, the oscillation frequency is high, which means there is a fear of the FET Q1 generating excessive heat and being damaged.

SUMMARY OF THE INVENTION

Accordingly, it is an object of the present invention to provide a switching power supply device in which the increase in the switching frequency of the main switching element is restrained, whereby it is possible to reduce the switching loss, prevent the increase in the output ripple noise voltage due to intermittent operation, and restrain the heat generation of the main switching element at the time of short-circuiting.

To achieve the above object, there is provided, in accordance with the present invention, a switching power supply device for supplying electrical energy to a load of the type which is equipped with a transformer having a primary coil, a secondary coil and a feedback coil, a main switching element connected in series with the primary coil and a control circuit connected between a control terminal of the main switching element and the feedback coil, and wherein the main switching element is repeatedly turned ON and OFF, excitation energy being accumulated in the primary coil during the ON-period of the main switching element, the excitation energy accumulated in the primary coil being discharged from the secondary coil during the OFF-period of the main switching element, the excitation energy being converted into electric energy to be supplied to a load, and further wherein the control circuit includes a period control means for making the OFF-period of the main switching element a predetermined period which continues after the completion of the discharge of the excitation energy from the secondary coil.

In another aspect of the present invention, there is provided a switching power supply device wherein the above-mentioned period control means comprises a switch circuit provided between the feedback coil and the control terminal of the switching element and wherein, by turning the switch circuit ON and OFF, the supply of current or voltage to the control terminal of the main switching element is cut off for a predetermined period after the main switching element is turned off.

In still another aspect of the present invention, there is provided a switching power supply device wherein the switch circuit comprises a time constant circuit including a transistor, a charge/discharge capacitor having one end connected to the control terminal of the transistor and a resistor, wherein charging or discharging of the charge/discharge capacitor is effected after the main switching element has been turned off and wherein the supply of current or voltage to the control terminal of the main switching element is cut off for a predetermined period of time that elapses until the current or voltage of the control terminal of the transistor reaches a threshold value and the transistor is turned on.

In another aspect of the present invention, there is provided a switching power supply device further comprising a constant-current circuit for making the current flowing through the charge/discharge capacitor constant in order to make the charging time for the charge/discharge capacitor forming the switch circuit a predetermined period of time.

The above-mentioned constant-current circuit comprises a transistor, a zener diode connected to the base of the transistor, and a resistor.

In the switching power supply device, constructed as described above, the OFF-period of the main switching element is a predetermined period continuing after the discharge of the excitation energy from the transformer independently of the load, so that the increase in the switching frequency is restrained, whereby, in particular, the switching loss when the load is light is substantially reduced.

Further, the OFF-period of the main switching element is a predetermined period that continues after the discharge of the excitation energy from the transformer, so that the response of the control system to the switching operation is reliably effected. Thus, the intermittent operation of the main switching element is prevented, and there is no fear that the output ripple noise voltage will increase.

Further, since the starting time is extended, the oscillation period is long even if the main switching element repeats starting and stopping at the time of short-circuiting, so that the switching loss is small, and the heat generation quantity of the main switching element is small.

Further, by providing a constant-current circuit for controlling the starting current constant, the charging/discharging time for the charge/discharge capacitor of the switch circuit is kept constant even when the variation range of the input voltage from the AC power source is large, so that the control operation for making the OFF-period of the main switching element a predetermined period can be reliably effected.

Other features and advantages of the present invention will become apparent from the following description of the invention which refers to the accompanying drawings.

DETAILED DESCRIPTION OF EMBODIMENTS OF THE INVENTION

Figure 4:
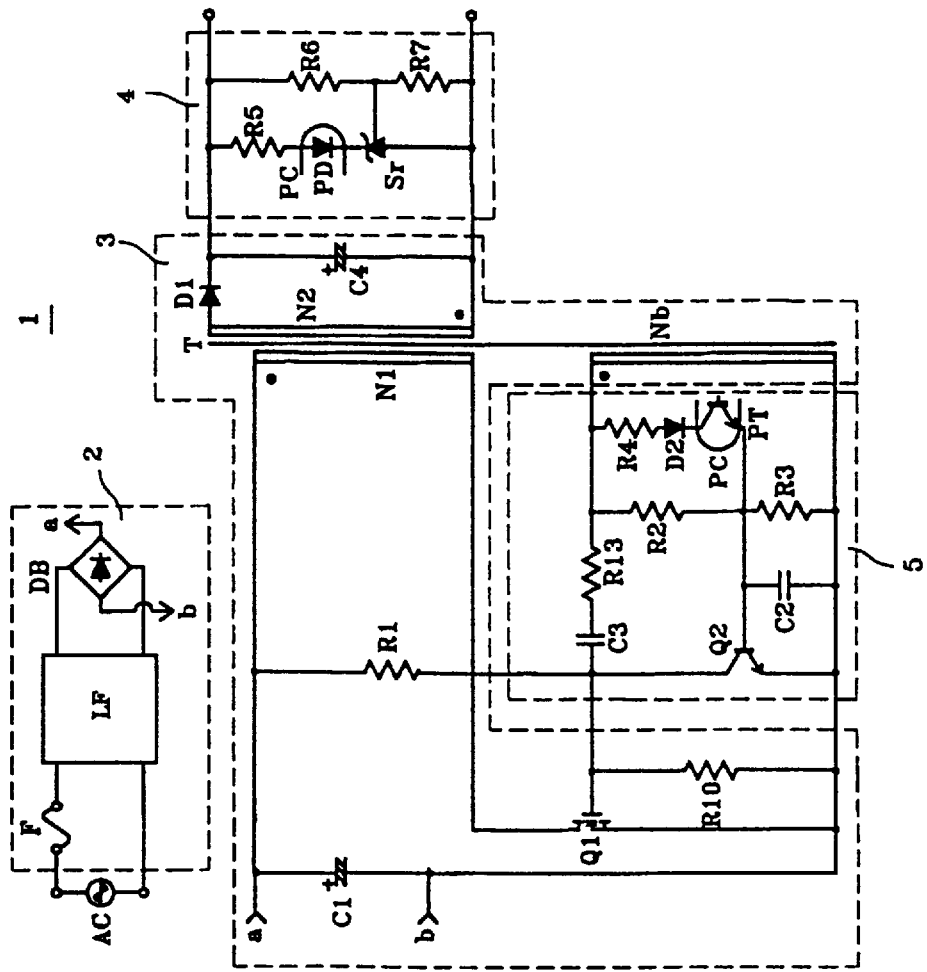
FIG. 4 is a circuit diagram showing a conventional switching power supply device.
Figure 5:
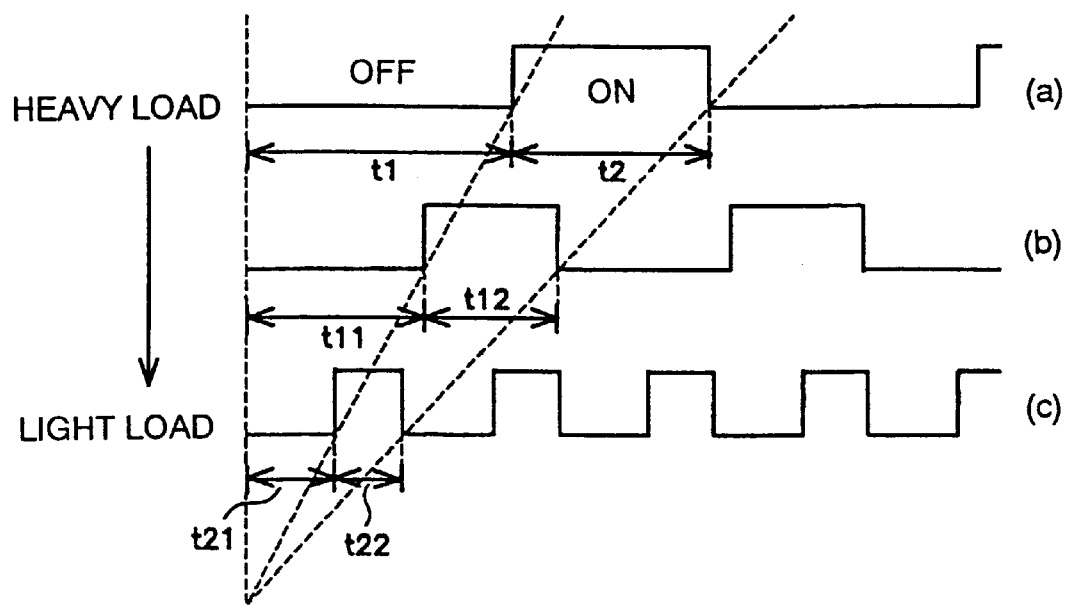
FIG. 5 is a schematic diagram showing how the lengths of the ON-period and the OFF-period of the main switching element differ depending upon the load in the switching power supply device shown in FIG. 4.

The construction of a switching power supply device according to an embodiment of the present invention will be described with reference to FIG. 1. The switching power supply device 1a shown in the drawing differs from the switching power supply device shown in FIG. 4 in that the former includes a switch circuit 6 serving as a period control means and a constant-current circuit 7. In the drawing, apart from the switch circuit 6 and the constant-current circuit 7, the components which are the same as or equivalent to those of FIG. 4 are indicated by the same reference numerals, and a further detailed description of such components will be omitted.

Figure 1:
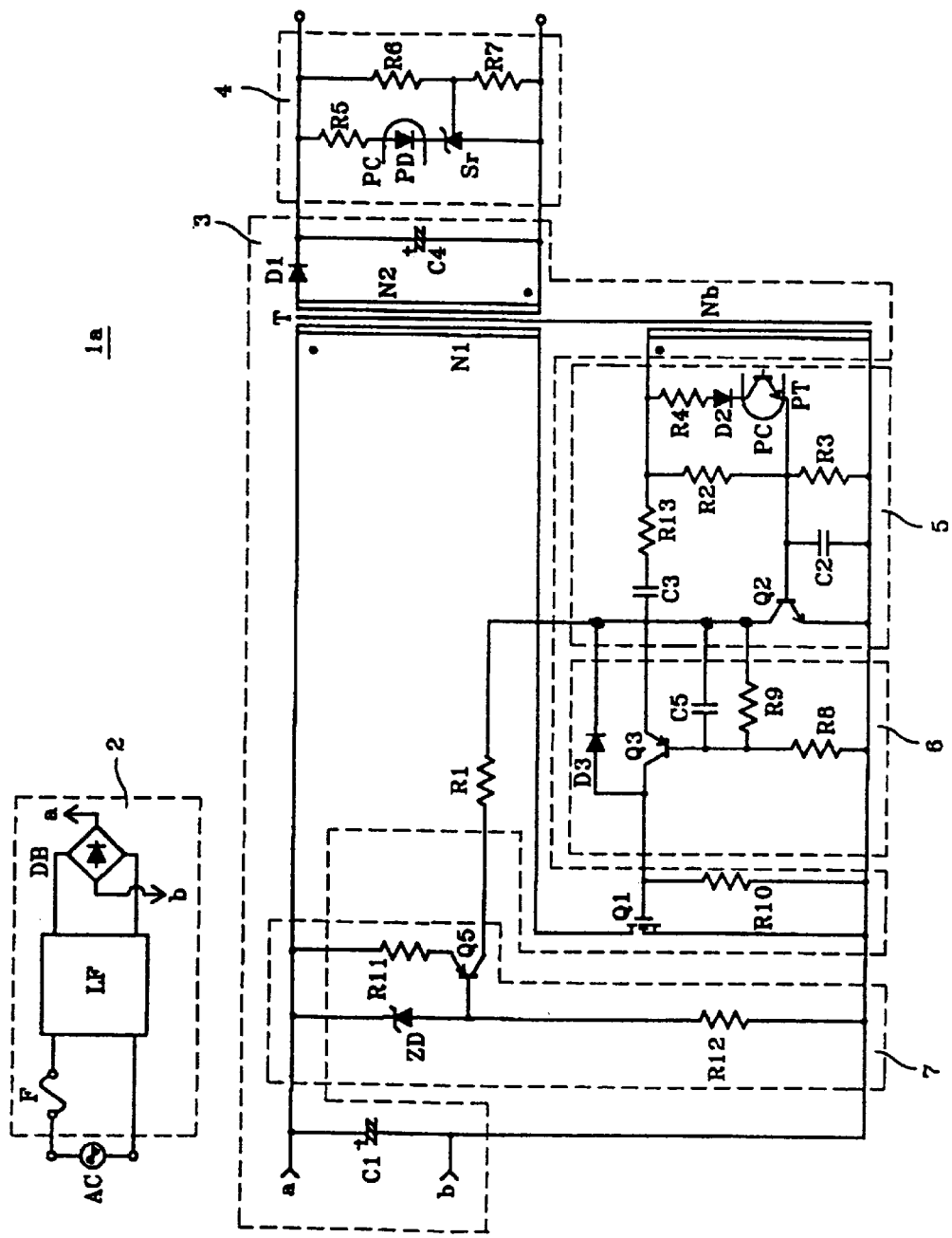
FIG. 1 is a circuit diagram showing a switching power supply device according to an embodiment of the present invention.

In FIG. 1, the switch circuit 6 of the switching power supply device 1a comprises a PNP-type transistor Q3, a charge/discharge capacitor C5, a diode D3, and resistors R8 and R9. In the transistor Q3, the emitter is connected to one end of the feedback coil Nb of the transformer T through the capacitor C3 and the resistor R13, the collector is connected to the gate of the FET Q1 serving as the main switching element, and the base is connected to the other end of the feedback coil Nb through the resistor R8. The capacitor C5 and the resistor R9 are connected in parallel between the base and emitter of the transistor Q3. The diode D3 is connected in parallel between the emitter and collector of the transistor Q3.

The constant-current circuit 7 comprises a transistor Q5, a zener diode ZD and resistors R11 and R12. The collector of the transistor Q5 is connected to one end of the primary coil N1 of the transformer T, and the emitter thereof is connected to a starting resistor R1. The zener diode ZD and the resistor R12 are connected between the positive and negative terminals of the capacitor C1.

The constant-current circuit 7, constructed as described above, serves to control the starting current supplied to the switch circuit 6 through the starting resistor R1 to a constant level. It can be replaced by a constant-current circuit of any type of known construction as long as it operates in a similar manner.

Next, the operation of this switching power supply device 1a, constructed as described above, will be described.

In the switching power supply device 1a, the application of the voltage generated in the feedback coil Nb of the transformer T to the gate of the FET Q1 is cut off for a predetermined period of time by the switch circuit 6 after the FET Q1 is turned off. That is, when the transistor Q2 is turned on and the FET Q1 is turned off, a current flows through the resistor R1, and the capacitor C5 of the switch circuit 6 starts to be charged. When this charging voltage reaches the threshold value of the transistor Q3, the transistor Q3 is turned on, a voltage is applied to the gate of the FET Q1, the FET Q1 is turned off, and rapidly turned on by positive feedback. Then, excitation energy is accumulated in the primary coil N1 of the transformer T, the capacitor C2 is charged to a threshold value, the transistor Q2 is turned on, and the FET Q1 is turned off. Thus, the period from the turning off of the FET Q1 to the turning on of the transistor Q3 is the OFF-period of the FET Q1. By controlling the charging/discharging time of the capacitor C5 of the switch circuit 6, the OFF-period of the FET Q1 is extended, and it is possible to make the OFF-period of the FET Q1 a substantially constant period that continues after the completion of the discharge of the excitation energy from the secondary coil N2 of the transformer T.

Further, the starting current flowing to the capacitor C5 through the resistor R1 is controlled to a constant level by the constant-current circuit 7, so that the charging time of the capacitor C5 is substantially constant.

Further, at the time of starting, the transistor Q3 is turned on after the charging voltage of the capacitor C5 constituting the switch circuit 6 has reached the threshold value of the transistor Q3, and the FET Q1 is turned on, so that the starting time is extended.

Figure 2:
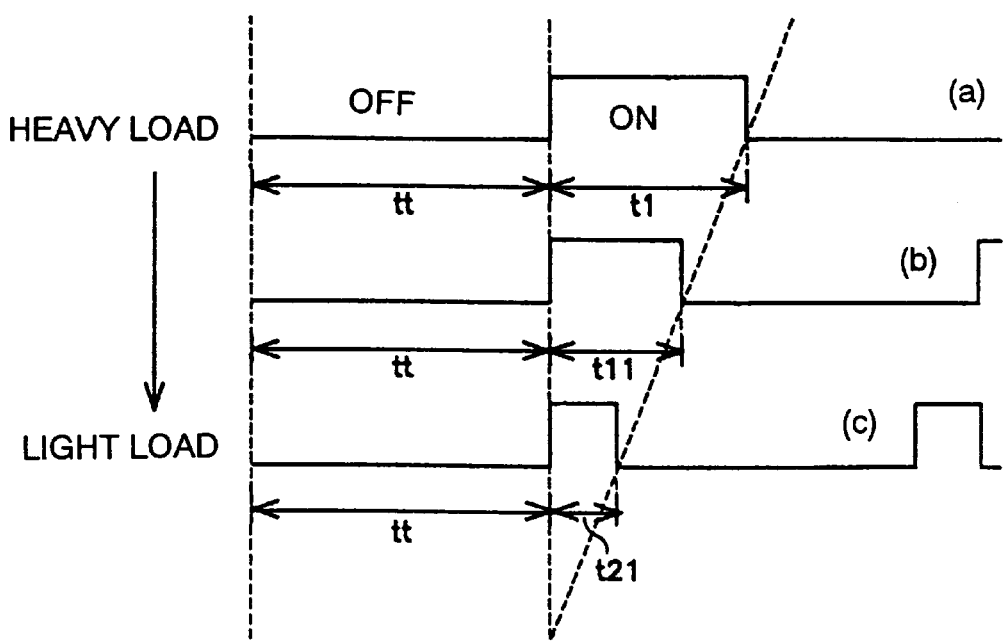
FIG. 2 is a schematic diagram showing how the lengths of the ON-period and the OFF-period of the main switching element differ depending upon the load in the switching power supply device shown in FIG. 1.

Next, FIG. 2 shows how, in this switching power supply device 1a, constructed as described above, the ON-period and the OFF-period determining the switching frequency of the FET Q1 vary depending on the fluctuation in load, i.e., the level of the load. In FIG. 2, numerals t1, t11 and t21 respectively indicate the ON-periods in the case (a) in which the load of the switching power supply device 1a is relatively heavy, the case (b) in which it is at a medium level, and the case (c) in which it is light. Symbol tt indicates the OFF-period. Since the OFF-period is set to a constant period tt that continues after the completion of the discharge of excitation energy, only the ON-period varies as t1-t11-t21. Thus, the fluctuation width of the switching frequency diminishes, and the increase in the switching frequency is restrained.

Further, since the OFF-period of the FET Q1 is a substantially constant period that continues after the discharge of excitation energy from the transformer independently of the level of the load, the response of the control system is reliably effected. Thus, intermittent operation of the FET Q1 is prevented, and there is no fear that the output ripple noise voltage will increase.

Further, due to the extension of the starting time, the oscillation period is long even when the FET Q1 repeats starting and stopping at the time of short-circuiting, so that the switching loss is small, and the quantity of heat generated by the FET Q1 is small.

Further, when the fluctuation range of the input voltage from the AC power source is large, the starting current is controlled constant by the constant-current circuit 7, so that the charging time of the charge/discharge capacitor C5 of the switch circuit 6 is maintained constant. Thus, the control operation for making the OFF-period of the FET Q1 a predetermined period is reliably effected.

Next, a modification of the above-described embodiment will be described with reference to FIG. 3. The switching power supply device 1b shown in the drawing differs from the switching power supply device 1a shown in FIG. 1 in the construction of the switch circuit 6a. In the drawing, apart from the switch circuit 6a, the components which are the same as or equivalent to those of FIG. 1 are indicated by the same reference numerals, and a further description of such components will be omitted. Further, as to the effect achieved by the switching power supply device 1b, it is the same as that of the switching power supply device 1a, so a description thereof will be omitted.

Figure 3:
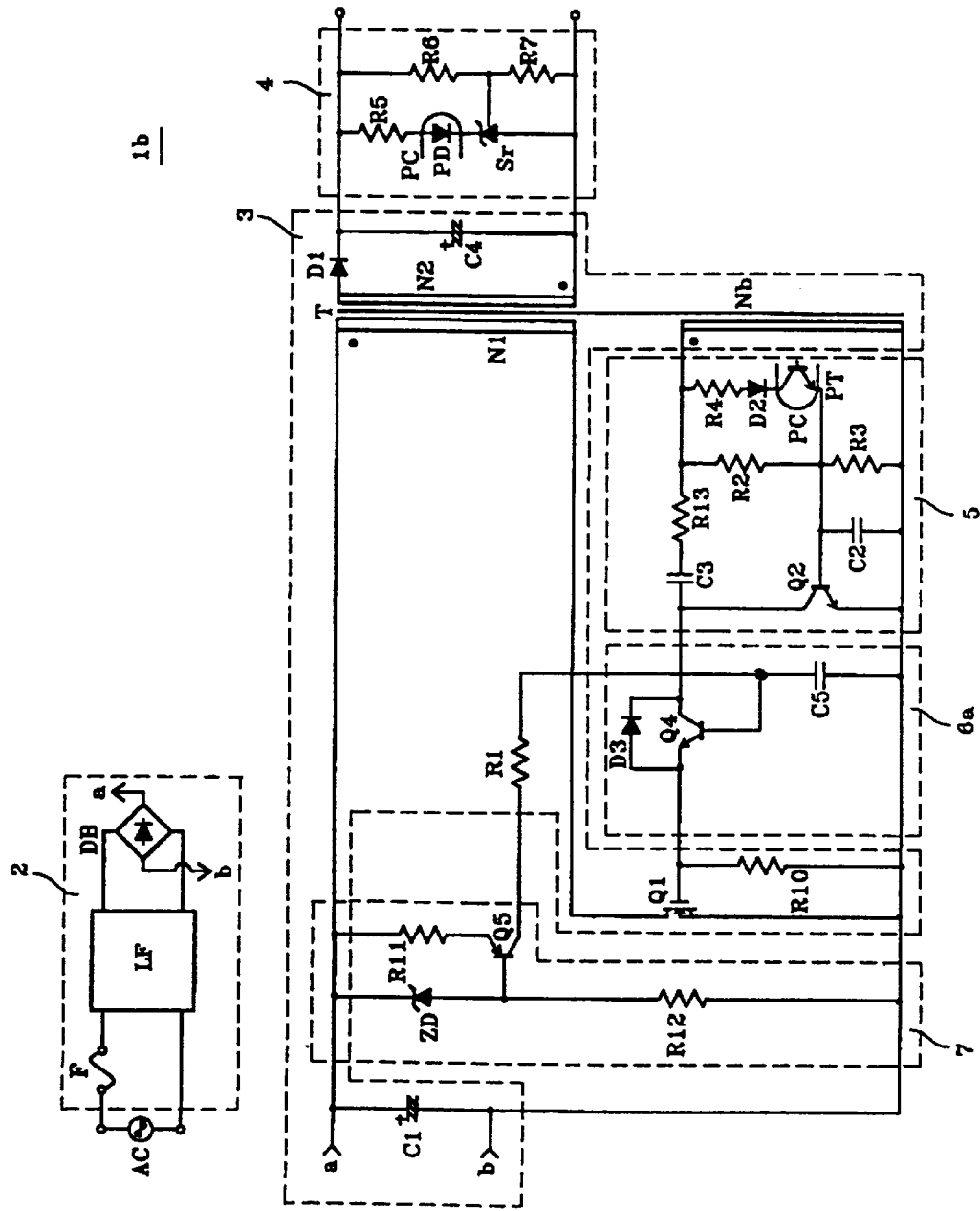
FIG. 3 is a circuit diagram showing a modification of the switching power supply device of FIG. 1.

In FIG. 3, numeral 1b indicates a switching power supply device, which comprises a switch circuit 6a serving as period control means. The switch circuit 6a comprises an NPN-type transistor Q4, a capacitor C5, a diode D3 and a resistor R10. In the transistor Q4, the collector is connected to one end of the feedback coil Nb of the transformer N through the capacitor C3 and the resistor R13 and the emitter is connected to the gate of the FET Q1 serving as the main switching element. One end of the capacitor C5 is connected to the base of the transistor Q4 and the other end thereof is connected to the feedback coil Nb of the transformer T. The diode D3 is connected in parallel between the emitter and collector of the transistor Q4.

While in the above-described embodiments a constant-current circuit is provided which maintains the starting current constant and makes the charging time of the charge/discharge capacitor constituting the switch circuit constant, the scope of the present invention also covers a switching power supply device which is not equipped with a constant-current circuit.

In the switching power supply device of the present invention, the OFF-period of the main switching element is a period that continues after the discharge of excitation energy from the transformer independently of the level of the load, so that the increase in the switching frequency is restrained, whereby the switching loss in the case of a light load, in particular, is substantially reduced.

Further, since the OFF-period of the main switching element is a period that continues after the discharge of excitation energy from the transformer independently of the level of the load, the response of the control system to the switching operation is reliably effected. Thus, intermittent operation of the main switching element is prevented, and there is no fear that the output ripple noise voltage will increase.

Further, at the time of starting, the transistor Q4 is turned on in the switch circuit after the charging voltage of the charge/discharge capacitor has reached the threshold value of the transistor Q4, and the main switching element Q1 is turned on, so that the starting time is extended. Thus, even when the main switching element Q1 repeats starting and stopping at the time of short-circuiting, the oscillation period is long and the switching loss is small, so that the quantity of heat generated by the main switching element is small.

Further, due to the preferred provision of a constant-current circuit for controlling the starting current to a constant level, the charging time of the charge/discharge capacitor constituting the switch circuit is maintained constant even when the fluctuation range of the input voltage from the AC power source is large, so that the control operation for making the OFF-period of the main switching element a predetermined period is reliably effected.

Although the present invention has been described in relation to particular embodiments thereof, many other variations and modifications and other uses will become apparent to those skilled in the art. Therefore, the present invention should be limited not by the specific disclosure herein, but only by the appended claims.

What is claimed is:

1. A switching power supply device comprising:
    a transformer having a primary coil, a secondary coil and a feedback coil;
    a main switching element having a control terminal, the main switching element being connected in series with the primary coil;
    a control circuit connected between the control terminal of the main switching element and the feedback coil to turn the main switching element on and off alternatingly, the main switching element thereby having an ON-period and an OFF-period, the main switching element being turned on and off based on a voltage generated in the feedback coil so that an excitation energy is accumulated in the primary coil during the ON-period of the main switching element, the excitation energy accumulated in the primary coil being discharged from the secondary coil during the OFF-period of the main switching element and converted into electric energy to be supplied to a load, the load having an impedance level that can vary; and
    a period control circuit to make the OFF-period of the main switching element a predetermined period which continues after the completion of the discharge of the excitation energy from the secondary coil, regardless of variation of the impedance level of the load.

2. The switching power supply device of claim 1, wherein said period control circuit comprises a switch circuit provided between the feedback coil and a control terminal of the main switching element and wherein, by turning on and off the switch circuit, the supply of current or voltage to the control terminal of the main switching element is cut off for a predetermined period after the main switching element is turned off.

3. The switching power supply device of claim 2, wherein the switch circuit is turned on and off by a time constant circuit charging from an input voltage supplied to the switching power supply device.

4. The switching power supply device of claim 2, wherein the switch circuit comprises a time constant circuit including a first transistor, a charge/discharge capacitor having one end connected to a control terminal of the first transistor and a resistor, and
    wherein charging or discharging of the charge/discharge capacitor is effected after the main switching element has been turned off, the supply of current or voltage to the control terminal of the main switching element being cut off for a predetermined period of time that elapses until the current or voltage at the control terminal of the first transistor reaches a threshold value and the first transistor is turned on.

5. The switching power supply device of claim 4, further comprising a constant-current circuit for making the current flowing through the charge/discharge capacitor constant in order to make the charging time for the charge/discharge capacitor of the switch circuit a predetermined period of time.

6. The switching power supply device of claim 5, wherein said constant-current circuit comprises a second transistor, a zener diode connected to the base of the second transistor and a resistor.

7. The switching power supply device of claim 1, wherein the control circuit is further responsive to an input signal from a sensing circuit connected to the secondary coil of the transformer, thereby to control when said main switching element is turned off and thereby to control an output voltage from said secondary coil.

* * * * *